(12) United States Patent
Neugebauer et al.

(10) Patent No.: US 7,699,234 B2
(45) Date of Patent: Apr. 20, 2010

(54) TRANSMISSION RANGE ADJUSTMENT ACCORDING TO NETWORK CONDITIONS

(75) Inventors: Mario Neugebauer, Dresden (DE); Jörn Plönnigs, Dresden (DE); Klaus Kabitzsch, Dresden (DE)

(73) Assignee: SAP AG, Walldorf (DE)

( * ) Notice: Subject to any disclaimer, the term of this patent is extended or adjusted under 35 U.S.C. 154(b) by 798 days.

(21) Appl. No.: 11/477,341

(22) Filed: Jun. 28, 2006

(65) Prior Publication Data
US 2008/0005351 A1 Jan. 3, 2008

(51) Int. Cl.
*G06K 19/06* (2006.01)
*G06F 19/00* (2006.01)

(52) U.S. Cl. ...................... 235/492; 235/385
(58) Field of Classification Search .......... 235/380, 235/492, 383, 385; 340/329, 338, 331, 572.1, 340/10.5, 10.1
See application file for complete search history.

(56) References Cited

U.S. PATENT DOCUMENTS

| | | | | | |
|---|---|---|---|---|---|
| 5,774,876 | A | * | 6/1998 | Woolley et al. | 705/28 |
| 5,804,810 | A | * | 9/1998 | Woolley et al. | 235/492 |
| 5,959,568 | A | * | 9/1999 | Woolley | 342/42 |
| 2005/0040974 | A1 | * | 2/2005 | Shanks et al. | 341/53 |
| 2005/0152318 | A1 | * | 7/2005 | Elbatt et al. | 370/338 |
| 2006/0145855 | A1 | * | 7/2006 | Diorio et al. | 340/572.1 |
| 2009/0059827 | A1 | * | 3/2009 | Liu et al. | 370/311 |
| 2009/0116430 | A1 | * | 5/2009 | Bonta et al. | 370/329 |

FOREIGN PATENT DOCUMENTS

WO     02054646 A2    7/2002

OTHER PUBLICATIONS

Extended EP Search Report for EP Application No. 07011286.7, mailed Dec. 20, 2007, 4 pages.

Meguerdichian, S., et al, "Coverage Problems in Wireless Ad-Hoc Sensor Networks", IEEE INFOCOM 2001 (Apr. 22, 2001), pp. 1380-1387.

Stojmenovic, I., et al, "Power-Aware Localized Routing in Wireless Networks", IEEE Transactions on Parallel and Distributed Systems, vol. 12, No. 11 (Nov. 2001), pp. 1122-1133.

Wei, H-Y, et al, "Two-Hop-Relay Architecture for Next-Generation WWAN/WLAN Integration", IEEE Wireless Communications, vol. 11, No. 2 (Apr. 2004), pp. 24-30.

(Continued)

*Primary Examiner*—Thien M Le
(74) *Attorney, Agent, or Firm*—Brake Hughes Bellermann LLP

(57) ABSTRACT

A method for selecting between a multi-hop transmission route and a single-hop transmission route for transmitting data from a smart item in a network of smart items to a base station includes receiving signals at the smart item from neighboring smart items in a vicinity of the smart item, measuring a density of neighboring smart items around the smart item based on information in the received signals, and parameterizing a loss of energy in a signal transmitted between a neighboring smart item and the smart item as a function of distance between the neighboring smart item and the smart item. The parameterization is based on information in the received signals. Based on the measured density and on the parameterization of the loss of energy, a multi-hop transmission route or a single-hop transmission route is selected for transmitting data from the smart item to the base station.

20 Claims, 5 Drawing Sheets

OTHER PUBLICATIONS

Heinzelman et al., "Energy-Efficient Communication Protocol for Wireless Microsensor Networks", Proceedings of the 33rd Hawaii International Conference on System Sciences, vol. 8, 2000, pp. 1-10.

Neugebauer et al., "Duty Cycle Adaptation with Respect to Traffic", Proceedings of the 10th International Conference on Emerging Technologies and Factory Automation, Catania, Italy, Sep. 2005, pp. 425-432.

Chandrakasan et al., "Power Aware Wireless Microsensor Systems", Proceedings of the 28th European Solid-State Circuits Conference, Florence, Italy, Sep. 2002, pp. 47-54.

Gupta et al., "The Capacity of Wireless Networks", IEEE Transactions on Information Theory, vol. IT-46, No. 2, Mar. 2000, pp. 1-48.

Hui et al., "Sentry-Based Power Management in Wireless Sensor Networks", F. Zhao and L. Guibas (Eds.), Information Processing in Sensor Information Processing in Sensor Networks (IPSN), vol. 2634 of Lecture Notes in Computer Science Science, Palo Alto, CA, USA, Apr. 2003, pp. 458-472.

Chen et al., "Span: an energy-efficient coordination algorithm for topology maintenance in ad hoc wireless networks", ACM Wireless Networks, vol. 8, No. 5, Sep. 2002, pp. 481-494.

Narayanaswamy et al., "Power Control in Ad-Hoc Networks: Theory, Architecture, Algorithm and Implementation of the COMPOW Protocol", Proceedings of the European Wireless Conference—Next Generation Wireless Networks: Technologies, Protocols, Services and Applications, Feb. 2002, pp. 156-162.

Zhou et al., "Impact of radio irregularity on wireless sensor networks", Proceedings of the 2nd international conference on Mobile systems, applications, and services, Jun. 2004, pp. 125-138.

Glauche et al., "Continuum percolation of wireless ad hoc communication networks", Physica A: Statistical Mechanics and its Applications, vol. 325, No. 3-4, Jul. 15, 2003, pp. 1-30.

Grundke et al., "A Uniform Continuum Model for Scaling of Ad Hoc Networks", International conference on ad-hoc, mobile, and wireless networks, LNCS vol. 2865 (Oct. 2003), pp. 96-103.

* cited by examiner

TRANSMISSION RANGE ADJUSTMENT ACCORDING TO NETWORK CONDITIONS

TECHNICAL FIELD

This description relates smart item networks.

BACKGROUND

Smart item technologies may include, for example, radio-frequency identification (RFID) systems, embedded systems, sensor motes, and/or smart item networks, and may be used, for example, to provide business software applications with fast access to real-world data. For example, smart item technologies may be used support the detection, reading, or writing of RFID tags, as well as to support communication with, and control of, wireless smart item networks and embedded systems. In many instances, smart items may include devices that have local processing power, memory, and/or communication capabilities, and that are capable of providing data about the device and its properties, or information about a current state or environment of the smart item devices. Accordingly, some such devices may be used in the execution of service components of back-end or underlying business applications, and, in particular, may do so in a collaborative way, e.g., by forming mobile ad-hoc networks to collect, process, or transmit data.

Examples of smart item devices include an RFID tag, which may be passive or active, and which may be attached to a real-world object and used to provide product or handling information related to the object. Other examples of smart item devices includes transceivers, for example, various sensors, such as, environmental sensors (e.g., a temperature, humidity, or vibration sensor), which, as just referenced, may be capable of communicating to form one or more smart item networks. These and other types of smart item devices also may include embedded systems, which may refer generally to any system in which a special-purpose processor and/or program is included, and/or in which the system is encapsulated in the device being controlled.

Through automatic real-time object tracking, smart item technology may provide businesses with accurate and timely data about business operations, and also may help streamline and automate the business operations. Accordingly, cost reductions and additional business benefits (e.g., increased asset visibility, improved responsiveness, and extended business opportunities) may be obtained.

Information may be transmitted from an origination smart item within a network of smart items to another destination smart item and/or to a destination base station within the network. Transmission of the information from the origination item to the destination item may require different amounts of energy depending on the transmission path from the origination item to the destination item.

SUMMARY

In a first general aspect, a method exists for selecting between a multi-hop transmission route and a single-hop transmission route for transmitting data from a smart item in a network of smart items to a base station. The method includes receiving signals at the smart item from neighboring smart items in a vicinity of the smart item, measuring a density of neighboring smart items around the smart item based on information in the received signals, and parameterizing a loss of energy in a signal transmitted between a neighboring smart item and the smart item as a function of distance between the neighboring smart item and the smart item. The parameterization is based on information in the received signals. Based on the measured density and on the parameterization of the loss of energy, a multi-hop transmission route or a single-hop transmission route is selected for transmitting data from the smart item to the base station.

Implementations can include one or more of the following features. For example, measuring the density can include receiving, at the smart item, information about the locations of the neighboring smart items. Parameterizing the loss of energy can include receiving information at the smart item about the locations of the neighboring smart items, receiving, from each of the neighboring smart items at the smart item, a signal having a calibrated transmission power, measuring a power of each of the received signals, and comparing the calibrated transmission power to the measured received power for each of the signals to determine an amount of energy lost during transmission between each of the neighboring smart items and the smart item. Parameterizing the loss of energy also include determining a parameter, $\alpha$, to relate a power of a signal received at the smart item, $P_{rec}$, to a power of the signal when transmitted from a neighboring smart item, $P_{trans}$, and a distance, r, between the smart item and the neighboring smart item through the relation, $P_{rec} \propto P_{trans}/r^{\alpha}$.

The method can also include storing pre-determined parameters characterizing an approximate equivalence between energy costs associated with single-hop transmission and multi-hop transmission for a model of the network of smart items, and selecting (based on the measured density, on the parameterization of the loss of energy, and on the pre-determined parameters) a multi-hop transmission route or a single-hop transmission route for transmitting data from the smart item to the base station.

The method can also include storing pre-determined parameters characterizing an approximate equivalence between energy costs associated with single-hop transmission and multi-hop transmission for a plurality of models of the network of smart items, and identifying pre-determined parameters characterizing an approximate equivalence between energy costs associated with single-hop transmission and multi-hop transmission for one of the plurality of models of the network of smart items. Then, based on the measured density, on the parameterization of the loss of energy, and on the identified pre-determined parameters, a multi-hop transmission route or a single-hop transmission route for transmitting data from the smart item to the base station can be selected.

Additionally, a transmission signal energy with which to transmit data from the smart item to the base station can be adjusted, where the transmission signal energy is adjusted to reduce an amount of energy expended during transmission of data from the smart item to the base station.

Also, an amount of energy required to transmit a bit of data between the smart item and a neighboring smart item can be determined, and an amount of energy required to receive a bit of data at the smart item from a neighboring smart item can be determined. Then, based on the measured density, based on the parameterization of the loss of energy, based on the amount of energy required to transmit a bit of data, and based on the amount of energy required to receive a bit of data, a multi-hop transmission route or a single-hop transmission route for transmitting data from the smart item to the base station can be selected.

Transmission signal powers of the smart item and of the neighboring smart items can be adjusted to ensure that each smart item in the network of smart items is connected to the base station. The multi-hop path between the smart item and the base station along different smart items in the network can be selected according to a shortest-path-finding algorithm.

In another general aspect, a smart item can exist in a network of smart items that includes a base station. The smart item can include an antenna for receiving signals from neighboring smart items of the network located in a vicinity of the smart item and a monitoring service. The monitoring service can be adapted for measuring a density of neighboring smart items around the smart item based on information in the received signals, parameterizing a loss of energy in a signal transmitted between a neighboring smart item and the smart item as a function of distance between the neighboring smart item and the smart item, wherein the parameterization is based on information in the received signals, and selecting, based on the measured density and on the parameterization of the loss of energy, a multi-hop transmission route or a single-hop transmission route for transmitting data from the smart item to the base station.

Implementations can include one or more of the following features. For example, the received signals can include information about the locations of the neighboring smart items, and where measuring the density of neighboring smart items around the smart item is based at least in part on the information about the locations of the neighboring smart items.

The signals received from neighboring smart items can include information about the locations of the neighboring smart items and signals having a calibrated transmission power. The monitoring service can also measure a power of a signal received from each of the neighboring smart items and can compare the calibrated transmission power to the measured received power to determine an amount of energy lost during transmission between each of the neighboring smart items and the smart item. Parameterizing the loss of energy further can include determining a parameter, $\alpha$, that relates a power of a signal received at the smart item, $P_{rec}$, to a power of the signal when transmitted from a neighboring smart item, $P_{trans}$, and a distance, $r$, between the smart item and the neighboring smart item through the relation, $P_{rec} \propto P_{trans}/r^{\alpha}$.

The smart item can also include a memory adapted for storing pre-determined parameters characterizing an approximate equivalence between energy costs associated with single-hop transmission and multi-hop transmission for a model of the network of smart items, and the monitoring service can be further adapted for selecting, based on the measured density, on the parameterization of the loss of energy, and on the pre-determined parameters, a multi-hop transmission route or a single-hop transmission route for transmitting data from the smart item to the base station.

The smart item can also include a memory adapted for storing pre-determined parameters characterizing an approximate equivalence between energy costs associated with single-hop transmission and multi-hop transmission for a plurality of models of the network of smart items. And the monitoring service can be further adapted for identifying pre-determined parameters characterizing an approximate equivalence between energy costs associated with single-hop transmission and multi-hop transmission for one of the plurality of models of the network of smart items and for selecting (based on the measured density, on the parameterization of the loss of energy, and on the identified pre-determined parameters) a multi-hop transmission route or a single-hop transmission route for transmitting data from the smart item to the base station.

The monitoring service can be further adapted for adjusting a transmission signal energy with which to transmit data from the smart item to the base station via intermediate nodes, where the transmission signal energy can be adjusted to reduce an amount of energy expended during transmission of data from the smart item to the base station. The smart item can be an RFID device. The monitoring service can be further adapted for adjusting a transmission signal power of the smart item to ensure that the smart item in the network is connected to the base station. The multi-hop path between the smart item and the base station along different smart items in the network can be selected according to a shortest-path-finding algorithm.

The details of one or more implementations are set forth in the accompanying drawings and the description below. Other features will be apparent from the description and drawings, and from the claims.

DETAILED DESCRIPTION

Figure 1:
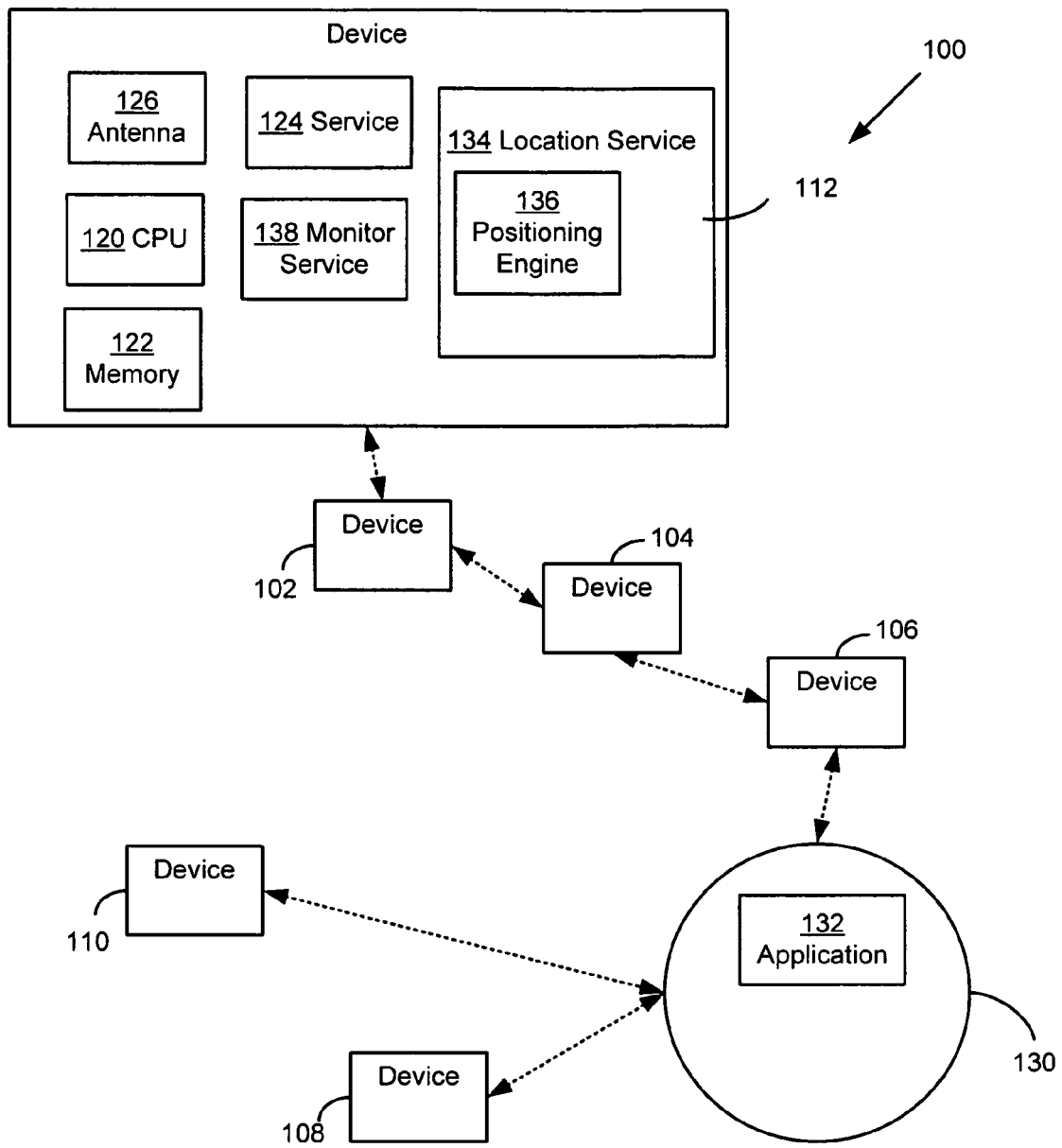
FIG. 1 is a block diagram of a network of smart items.

FIG. 1 is a block diagram of a network 100 of smart items. In the example of FIG. 1, the smart items network 100 can include various smart items or smart devices 102, 104, 106, 108, 110, and 112. In this context, it should be understood that the terms "smart items," "smart devices," "smart item devices," and similar terms, may be used similarly or interchangeably in various contexts. For example, the term "smart item" or "smart device" may refer to a device having local processing, storage, and communications capability, as referenced herein, or may refer to a combination of such a device and an object to which the device is affixed (e.g., a pallet containing merchandise for sale).

As part of the smart item network 100, such devices and/or device/object combinations also may be referred to as "nodes," or "network nodes" in some contexts. In the present description, the term "device" is used for brevity and consistency to refer to the described devices having the described features within the smart item network 100. However, it should be understood that the concepts described herein related to adjusting a transmission range for signals sent from a smart item, relating to selecting between single-hop and multi-hop communication, and relating to reducing the amount of energy expended during communication among nodes of a network may relate to virtually any such setting. The concepts and techniques may be particularly useful, for example, in contexts similar to those described herein, in which the networks may include wireless networks in which the nodes are constrained with regard to available energy, memory, computational power, or bandwidth.

Thus, the devices 102-112, and potentially other devices within the smart item networks 102 and 104 (and other smart item networks) may provide real-world data to one or more business data processing systems, applications, or processes, in a timely and accurate manner. For example, as shown in FIG. 1, the network 100 can include, or communicate with, one or more applications 132 within a base station 130. Thus, the devices 102-112 may exchange data with the base station, such that the data can be used by the application(s) 132 to perform a process.

In some implementations, the application(s) 132 may include, for example, inventory management systems, supply chain management systems, retail store management systems, warehouse management systems, product life cycle management systems, monitoring and control or environmental conditions in a space, and any other system(s) that may be used to execute processes with respect to real-world objects, where such real-world objects may include, for example, products for sale, pallets, or other shipment elements, patients, or manufacturing materials/equipment. Thus, the processes, including those portions of the processes deployed and executed at the local level of the real-world objects, may be used, for example, to determine inventory levels, set pricing levels, evaluate marketing strategies, evaluate manufacturing or production technologies, reduce theft, monitor and control environmental conditions, or maintain safety.

In FIG. 1, the device 112 is illustrated as including a central processing unit (CPU) 120, as well as a memory 122. Thus, the device 112 should be understood to be capable of various levels of computing capabilities, including, for example, processing or transmitting sensed data (in the case where the device 110 includes, or is associated with, a sensor). Additionally, the device 112 may include an antenna for transmitting data to and/or receiving data from other devices 102-110 and the bases station 130. The device 112 may include a power meter 128 for measuring a power of a received or transmitted signal. The device can also include a location service 135 and a monitor service 138.

Although not specifically illustrated in FIG. 1 for the sake of clarity and brevity, it should be understood that all of the devices 102-112 also may include the same, additional, or alternative computing, and communications capabilities, including, for example, the communication capability to form and participate in the smart item network 100, as shown, which may include, for example, a wireless network(s) and/or a peer-to-peer network(s). That is, it should be understood that the devices 102-112 may include other standard elements and features, not specifically illustrated in FIG. 1 for the sake of brevity, such as, for example, a (e.g., radio) transceiver and a local power supply or battery.

Thus, the smart item network 100 may be used to collect, process, filter, aggregate, or transmit data that may be useful to related business processes, and, more specifically, may be used to execute portions of the business processes (e.g., business logic), that are best-suited for (or benefit most highly from) local execution. Specifically, in the example of FIG. 1, portions of a business processes/business logic deployed on the smart item network 100 may include a service 124 that is deployed on the device 112.

For example, the service 124 may represent an enabling service that, e.g., enables collaboration between two or more of the devices 102-112; or may represent a management service that, e.g., manages power consumption of the device 112; or may represent actual business services that, e.g., execute business-specific logic (such as determining a local environmental parameter (e.g., a temperature), and whether the local environmental parameter exceeds a defined value, and whether any action should be taken in response to the local environmental parameter exceeding the defined value).

In general, it should be understood that the service 124, and other services discussed herein, refer generally to software components that support a defined functionality, may provide a defined interface through which the service may be invoked, and that may be combined with one another to obtain/provide additional or more complex functionalities.

For example, the monitor service 124 may represent a monitoring service 127 that, e.g., enables communication between the device 112 and neighboring devices 102-110, and 130, so that the service can monitor the environment in which the device 112 is located. For example, the monitor service 138 may be adapted to query neighboring devices 102-110, and 130 to send information about their locations and/or to send a signal having a calibrated signal power. The monitor service 138 may also be adapted to respond to a query from another smart item to send information about its location and/or to send a signal having a calibrated signal power. When information about the locations of neighboring devices is received from neighboring devices, the monitor service 138 may use the information to calculate a density of devices in its neighborhood and/or to select a transmission path for data from the device 112 to another device 102-110 or to the base station 130. The received signal power of the calibrated signals can be measured with the power meter 128 at the device 112 and compared with the calibrated signal power with which the signal was transmitted from another device 102-110 or 130 to determine an amount of energy lost during transmission of the calibrated signal. Such information may be used by the service to determine its local transmission environment.

The location service 134 may include a positioning engine 136 that receives signals transmitted from other devices 102-110 or base station 130 and picked up by the antenna 126 and that processes the signals to transform the received signals into co-ordinates of the other devices or base station. The positioning engine 136 can be used for both indoor and outdoor tracking. In addition, the positioning engine of the location service may generate a location signal that is transmitted to other devices 102-110 or to the base station 130 to communication the position of the device 112.

For example, a variety of positioning engines 136 for indoor tracking can be used in this system. These may include systems in which the antenna 126 receives or transmits radio signals for location tracking using radio protocols such as IEEE 802.11b, Bluetooth, or Zigbee. The positioning techniques used by engines 136 that process such signals may include techniques based on the signal strength or time information of the radio signals. Furthermore, the radio signals mentioned above may be exchanged between tracked devices or between tracked devices and so-called beacons, which are pre-installed radio frequency transceivers. In another embodiment, a positioning engine 136 may use a combination of motion sensing with infrared or other communication techniques for identifying the co-ordinates of tracked resources. For outdoor tracking, the antenna 126 may receive Global Positioning System (GPS) signals and the engine 136 may process these signals to determine a position of the technology. Also, a hybrid of positioning techniques mentioned above may be used, e.g., for improved accuracy. The positioning engine 136 can integrate information from both outdoor and indoor positioning engines to determine the co-ordinates of tracked resources.

Thus, the positioning engine 136 receives location signals from other smart items 102-110 and from the base station 130, interprets the location signals, and converts them into location co-ordinates.

Figure 2:
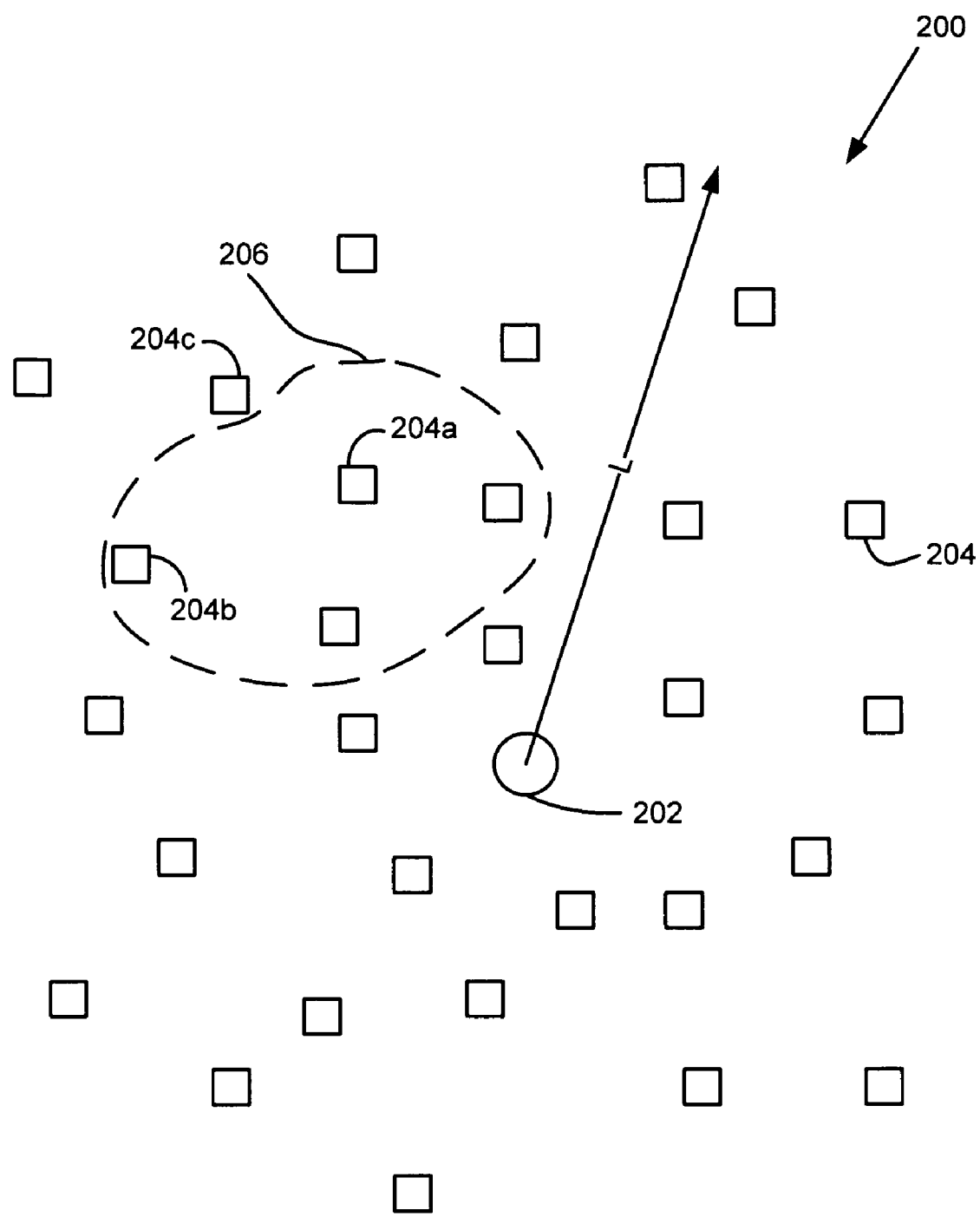
FIG. 2 is a block diagram of a network of smart items.

FIG. 2 is a block diagram of a network 200 of smart items. The network 200 can include one or more base stations 202, and many smart devices 204 around the base station, within a radius, L, of the base station. Although, for convenience, the smart items 204 are shown as distributed over a two-dimensional area around the base station, the smart items 204 can be distributed over a three-dimensional area. The smart items network 200 can be deployed, for example, for monitoring a physical condition or environment, or for monitoring a business process, and to this end messages may be exchanged between the devices 204 and between the devices and the base station 202. The topology of the network 200 may be laid out in a simple star, in which each device 204 communicates with the base station 202 via a direct link (i.e., using single-hop transmission), or in a meshed network, in which at least some devices 204 communicate with the base station 202 via intermediate links to other devices (i.e., using multi-hop transmission). Thus, in a star topology each device must be able to transmit a signal with sufficient power to be received at the base station 202, whereas in a meshed network the base station 202 is not required to be within communication distance of every network node 204. Hence, in a meshed network each node 204 might use one or more neighboring nodes as relays to reach the central base station 202 as the data sink.

Data received at the base station 202 can be interpreted and further processed completely in the base station. Therefore, each sensor node 204 in the field has to maintain a durable link to the base station. In a wireless network 200, nodes 204 may be deployed in remote locations where only battery power is available to power the device, such that energy is a scarce resource. To conserve this scare resource, energy expended during communication with the base station should be minimized.

Depending on environmental conditions within the network 200, single- or multi-hop transmission may be advantageous for conserving energy during communication between a smart item 204 and the base station 202. Thus, smart items 204 can sample environmental conditions that affect the energy consumption during single- and multi-hop transmission, and the conditions can be analyzed to determine whether single- or multi-hop transmission is advantageous. As explained in more detail herein, environmental conditions that can affect the decision to use single- or multi-hop transmission can include the density of smart items 204, the number of neighboring smart items with which a smart item 204 can communicate, and the attenuation of signal power as a signal is transmitted from a smart item 204 to neighboring smart items or from a smart item to the base station 202.

The nodes 204 of the network 200 can be distributed (e.g., randomly) within the vicinity of a base station 202. Assuming a two-dimensional distribution of N nodes centered around a base station 202, the density of nodes within the radius, L, is $$\rho = \frac{N}{\pi L^2}.$$

In a three-dimensional distribution, the density of nodes would be $$\rho = \frac{3N}{4\pi L^3}.$$

If multiple base stations exist in the network 200, the density of N nodes can be expressed in terms of the number of nodes, $N_n$, per the number of base stations, $N_{bs}$, in a particular area, i.e., $$\rho = \frac{N_n}{N_{bs}}.$$

For each smart item 204 of the network 200 to communicate with the base station, the energy of the signals transmitted from the smart items must be either sufficient to connect each smart item 204 with the base station or sufficient so that each smart item 204 can be connected to the base station 202 though a network of intermediate smart items. The energy of transmitted signals can be expressed in terms of a neighborhood degree parameter, $k_{ngb}$, that defines the number of neighboring smart items for which the transmission signal energy of a particular smart item is sufficient to communicate with. The neighborhood degree parameter, $k_{ngb}$, is related to the transmission energy used to transmit data from a smart item because to achieve a higher $k_{ngb}$ the transmission signal energy of the node must be higher.

Signals transmitted from a smart item 204 need not propagate with equal strength uniformly in all directions. Rather, the energy of the transmission signal can be attenuated by different amounts as a function of distance as the signal propagates in different directions. Thus, as shown in FIG. 2, the transmission range 206 of a smart item 204a is indicated by a dashed line, and the smart item 204a may be able to communicate with a smart item 204b but unable to communicate with another smart item 204c, even though the smart item 204c is closer to the smart item 204a than the smart item 204b. Thus, for the smart item 204a with a transmission range 206, the value of $k_{ngb}$ would be 3, because the smart item 204a can transmit signals to three other smart items within its transmission range 206. The transmission range, and $k_{ngb}$, can be increased by increasing the transmission signal energy.

To ensure that each smart item 204 is connected to the base station 202, the connectivity of the network can be checked for different combinations of the parameters $k_{ngb}$ and $$\rho = \frac{N_n}{N_{bs}}.$$

Figure 3:
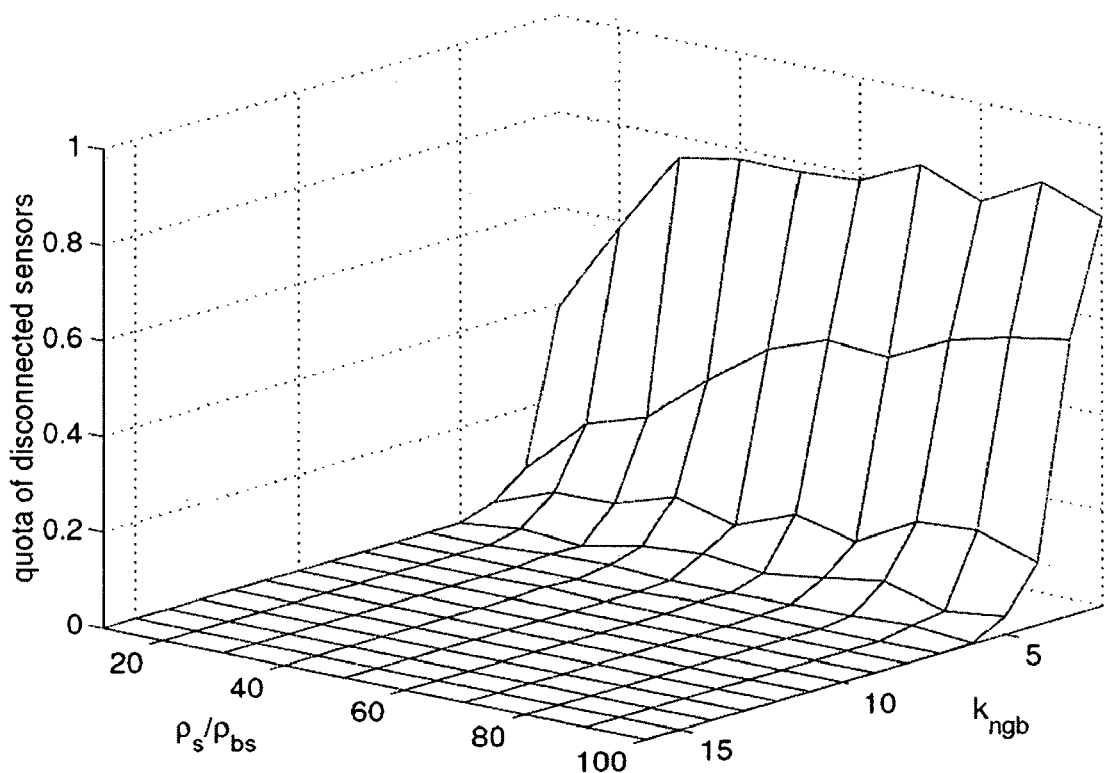
FIG. 3 is an example plot of the connectivity of a network of nodes as a function of node density and neighborhood degree.

An undirected graph G=(V,E) can be constructed using N vertexes that represent the positions of the smart items 204 in the network and edges, E, represent connections between smart items or between a smart item and the base station 202. For G a reachability matrix, R, can be defined where R[i, j]=1 if there is a way from node i to node j. With the base station 202 defined as node 1, the connectivity λ(G) can be determined through the equation, $$\lambda(G) = \frac{1}{N}\sum_{j=1}^{N}[1, j], \qquad (1)$$

where λ(G) effectively measures the proportion of smart items that can communicate with the base station via at least a multi-hop path over several intermediate smart items 204. The value of λ(G) depends on the sensor density and neighborhood degree, as can be understood by performing a simulations in which the number, N, of smart items within a fixed radius of the base station 202 is varied between 10 and 100 and $k_{ngb}$ is varied between 2 and 16. By randomly distributing the sensors in 100 different positions for each (N, $k_{ngb}$) combination, and assuming that the transmission signals propagate isotropically from each smart item, an average value of $\lambda(G)$ can be determined for each $(N, k_{ngb})$ combination. The results of these simulations are plotted in FIG. 3, where $1-\lambda(G)$ is plotted on the vertical axis as a function of $k_{ngb}$ and $\rho_s/\rho_{bs}$, where the $\rho_s/\rho_{bs}$ is equivalent to $$\rho = \frac{N_n}{N_{bs}},$$

because only one base station is used in the simulation. As seen from FIG. 3, the connectivity depends only loosely on the density of smart items, but depends strongly on the number of neighbors with which a smart item 204 can communicate, $k_{ngb}$, and only for $k_{ngb}>5$ are all the smart items 204 in the network connected to the base station 202. Thus, for these conditions, for all the smart items 204 of a network 200 to be connected to the base station 202 via multi-hop transmission, $k_{ngb}$ generally should be greater than 5.

Next, the energy costs of transmitting data from a smart item 204 to a base station 202 can be estimated. To model the energy cost of transmitting data from a smart item 204 to a base station, the transmission costs associated with all steps along the transmission path are considered. Thus, in one exemplary model of the energy dissipation during transmission of data, three sources of energy dissipation can be assumed. First, a fixed, per bit, energy, $E_{tx}$, that corresponds generally to the energy needed for protocol processing of the data in the smart item 204 can be required. For example, in one implementation, $E_{tx}$ can be equal to 50 nJ/bit. Second, transmitting one bit of data over a distance, r, may require an energy, $E_{tx,r}(r,\alpha)=cr^\alpha$, where c is a constant expressed in units such that $E_{tx,r}(r,\alpha)$ has units of pJ/bit, and $\alpha$ is a parameter that characterizes the attenuation of the data signal as it passes through a medium. The parameter, $\alpha$, can be known as a path loss parameter. For good transmission environments $\alpha$ is low (e.g., close to 2), while in harsh environments $\alpha$ is high (e.g. greater than 3). Third, the energy cost for receiving one bit of data, $E_{rx}$, is, like $E_{tx}$, a fixed amount per bit of data. For example, in one implementation, $E_{rx}$ can be equal to 50 nJ/bit. Other models of the energy dissipation that include a term that depends on the length of the transmission path may also be used to model the energy dissipation during data transmission.

In the case of single-hop transmission, only the energy drain at the smart item and the energy required to transmit the data over the distance, r, between the smart item and the base station contribute to energy cost of data transmission. Thus, the energy required to transmit data from a smart item 204 to the base station 202 using single-hop transmission is $$E_{single}=E_{tx}+E_{tx,r}(r,\alpha). \quad (2)$$

Note that the energy required during single-hop transmission does not include a term corresponding to the energy required for the bases station to receive the data. This is because the base station is assumed to have infinite energy (perhaps because the base station is powered by line power, rather than by battery power), so the energy consumed at the base station is not a scarce resource.

In the case of multi-hop transmission, the fixed amount of energy required to transmit and receive the data at each intermediate smart item in the transmission path between the originating smart item 204 and the base station 202 and the energy cost of transmitting the data along the transmission path between the originating smart item base station contribute to the total energy cost of data transmission. Thus, in one model, the energy required to transmit data from a smart item 204 to the base station 202 using multi-hop transmission is $$E_{multi} = (n-1)E_{rx} + \sum_{i=1}^{n} E_{tx} + E_{tx,r}(r_i, \alpha_i)), \quad (3)$$

where n is the number of hops along the transmission path, $r_i$ is the distance of the $i^{th}$ hop, and $\alpha_i$ parameterizes the energy lost during transmission along the $i^{th}$ hop. If a different model of the energy required to transmit data were used, equation (3) would include other corresponding terms.

Equations (2) and (3) can be used to compare the energy costs of using single-hop and multi-hop transmission to communicate data from a smart item 204 to a base station. In a simulation of the network, a radius, L, of the area around a base station can be selected and a number of smart items can be randomly distributed around the base station. The number of the smart items can be parameterized by the parameter, $\rho_s/\rho_{bs}$, and a path from an originating smart item to the base station can be selected according a shortest-path-finding algorithm (e.g., a Bellmann-Ford algorithm or Dijkstra's algorithm).

Dijkstra's algorithm, named after its inventor, Dutch computer scientist Edsger Dijkstra, is an algorithm that solves the single-source shortest path problem for a directed graph with non-negative edge weights. For example, if the vertices of the graph represent smart items 204 and the edge weights of the graph represent distances between pairs of smart items connected by a direct line, Dijkstra's algorithm can be used to find the shortest path between any two smart items or between a smart item and the base station. In this case the shortest path calculated is the path joining the smart item and the base station with the least overall distance.

In another example, if the path loss parameters, $\alpha_i$, for paths between different smart items varies, Dijkstra's algorithm can be used to find a path that minimizes an energy associated with transmitting data between smart items, $$E_{transmission} = \sum_{i=1}^{n} E_{tx,r}(r_i, \alpha_i)).$$

In such a scenario, the vertices of the graph can represent smart items, and edge weights can represent the transmission energy, $E_{tx,r}(r_i, \alpha_i)$ required for transmission between nodes of the network, and Dijkstra's algorithm can be used to calculate the lowest energy path between a node and the base station.

Once the paths from the different smart items to the base station have been defined, the energy cost of transmitting data from a smart item 204 to the base station can be determined by summing all energy consumptions (i.e., $E_{tx}$, $E_{tx,r}$, and $E_{rx}$) that occur along the path from the smart item to the base station. The energy costs for transmitting data from a node far from the base station are higher than for transmitting data from a node close to the base station. However, for convenience, the energy cost associated with each transmitting data from each node can be averaged to determine an average energy cost when using single- and multi-hop transmission for a particular density of nodes and a neighborhood degree parameter, $k_{ngb}$. For a particular set of parameters ($\rho_s/\rho_{bs}$, $k_{ngb}$, L, and α) a number of simulations (e.g., 100) can be performed with the smart items placed in randomly selected locations within the radius, L, of the base station and the energy loss values for single- and multi-hop transmission obtained for such a set of parameter can be averaged over the number of simulations.

Figure 4:
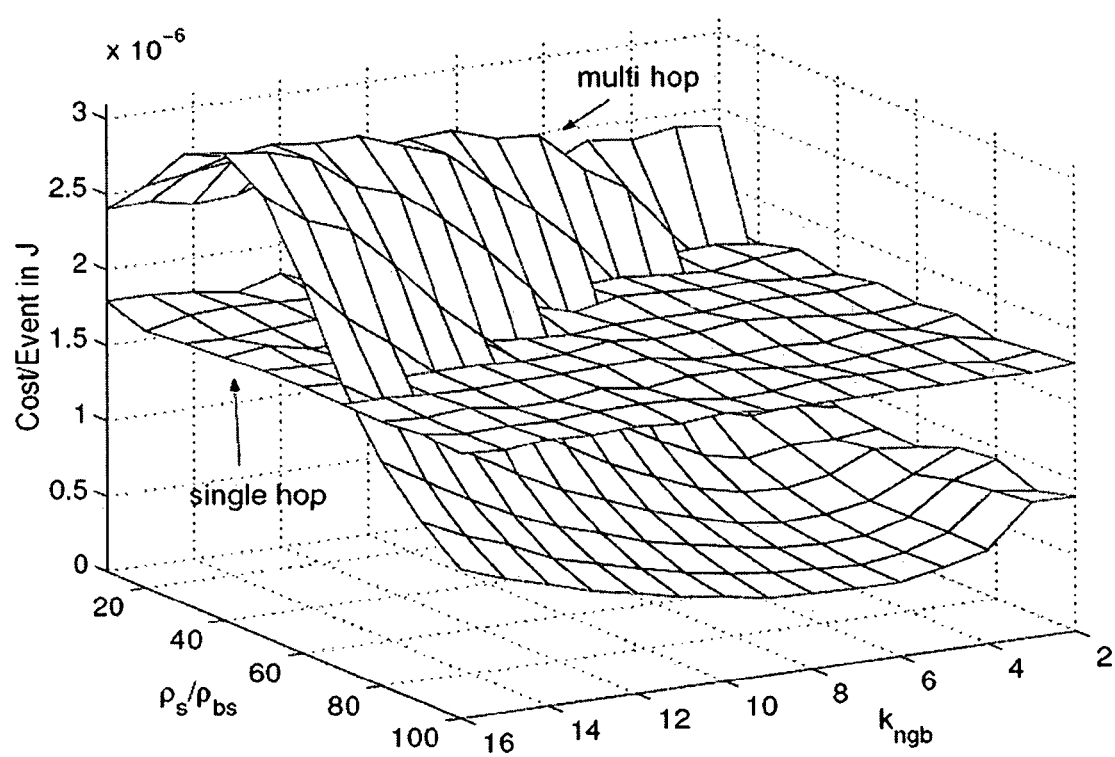
FIG. 4 is an example plot of the surfaces showing the energy cost of single-hop and multi-hop transmission as a function of node density and neighborhood degree.

In one example, results for such a simulation using L=15 meters and α=4 are shown in FIG. 4. As evidenced from FIG. 4, the energy costs per transmission event for single-hop transmission do not depend on smart item density, $\rho_s/\rho_{bs}$, or on neighborhood degree, $k_{ngb}$. The energy costs per transmission event for the multi-hop transmission can be lower than the energy cost of single-hop transmission for high node density and low neighborhood degree. Thus, for a high path loss parameter (e.g., α=4) situation, the energy savings of making many short path transmissions can compensate for the extra fixed energy costs associated with sending and receiving data at each node. For small neighborhood degrees (e.g., $k_{ngb}$<5) there is a slight increase in total cost because many short hops have to be performed and therefore the multiple receiving costs outweigh the savings of using shorter hops.

The results displayed in FIG. 4 indicate that varying the transmission power of the smart items, which varies the neighborhood degree parameter, $k_{ngb}$, can significantly affect the transmission range of the smart items in the network 200 and can affect the energy cost of transmitting data from a smart item 204 to the base station 202. Moreover, the transmission power of the smart items can be selected such that the parameters $k_{ngb}$ and $\rho_s/\rho_{bs}$ define a point in FIG. 4 such that the cost of multi-hop transmission is lower than the cost of single-hop transmission. The boundary between single-hop transmission being favorable (i.e., when values of $k_{ngb}$ and $\rho_s/\rho_{bs}$ are such that the multi-hop surface is above the single hop surface) and multi-hop being favorable (i.e., when values of $k_{ngb}$ and $\rho_s/\rho_{bs}$ are such that the multi-hop surface is below the single hop surface) is defined by the intersection of the multi-hop surface and the single-hop surface in FIG. 4. The line at which the two surfaces intersect can be approximated by a linear relationship between $k_{ngb}$ and $\rho_s/\rho_{bs}$, i.e., $$k_{ngb} = p \cdot \rho_s/\rho_{bs} + q, \quad (4)$$

where p and q are constants that are determined from the line defining the intersection of the two surfaces. A polynomial fit may also be used. Thus, when $k_{ngb} < p \cdot \rho_s/\rho_{bs} + q$, multi-hop transmission is preferred, but when $k_{ngb} > p \cdot \rho_s/\rho_{bs} + q$, then single-hop transmission is preferred.

Many other example simulations using different parameters values (e.g., of L and α) also can be generated and can result in graphs similar to the one shown in FIG. 4, which compare the energy costs of single-hop transmission to the cost of multi-hop transmission. From the different simulations, equations similar to equation (4) above for lines corresponding to the intersection between the multi-hop plane and a single-hop plane can be obtained, along with the parameters (p, q) for the different simulations. Thus, for M different values of $\alpha_i$, M sets of parameters $(p_i(\alpha), q_i(\alpha))$ can be obtained. These sets of parameters can be stored in the memory 122 of a smart item 112 and used, along with measurements of the local smart item density around the smart item, by the smart item to determine an optimum value of the transmission power (and therefore $k_{ngb}$), such that relatively little energy is expended in transmitting data from the smart item to the base station.

The determination of the optimum value of the transmission power can be performed during run-time or post-deployment of the network, when a smart item gathers information sufficient to determine a path loss parameter, α, a set of parameters $(p_i(\alpha), q_i(\alpha))$ corresponding to the path loss parameter, and a density of neighboring items, ρ. With information about $p_i(\alpha)$, $q_i(\alpha)$, and ρ, the value of $k_{ngb}$ that minimizes energy consumed during transmission from a smart item to the base station can be determined.

To perform these measurements, a particular smart item can measure the number of neighboring smart items within a spatially-defined vicinity of the particular smart item. To do this, each smart item within the network 200 may broadcast a message to the other smart items, where the messages contain information about the location of the broadcasting smart item. The messages may be received by the particular smart item nodes and stored in memory. After all smart items in the network have broadcast messages containing their positions, the particular smart item can determine how many smart items are within the spatially defined vicinity and then calculate a local smart item density.

To determine a local value of α, a particular smart item can receive a message from a neighboring smart item, where the message contains a signal that was transmitted with a known (i.e., calibrated) energy from the neighboring smart item. The particular smart item receiving the message then can measure the energy in the received signal, e.g., using a power meter 128 in the smart item device 112, to determine the attenuation of the signal as it traveled from the transmitting smart item to the receiving smart item. By measuring the attenuation of signal energy during propagation from several neighboring smart items (e.g., located at different distances from the particular smart item), an average value of α can be obtained to parameterize a loss of energy in signals transmitted between a neighboring smart item and the particular smart item as a function of distance between the item.

The loss of energy can be parameterized using models other than the power law relationship given by $E_{tx,r}(r,\alpha) = cr^{\alpha}$. For example, the loss of energy can be parameterized in terms of a polynomial fit to the equation $E_{tx,r}(r,a,b,c,d) = a + br + cr^2 + dr^3 + er^4$ where $E_{tx,r}$ is the energy lost during transmission from the neighboring smart item to the particular smart item, r is the distance between the two items, and a, b, c, d, and e, are parameters used to fit the data to the quartic equation.

Once the energy loss has been parameterized and the smart item density has been determined, the transmission power of the particular smart item can be selected, such that energy consumption during transmission of data from the particular smart item to the base station can be minimized. Thus, based on the measured path loss parameter, α, and the density of smart items, the smart item can autonomously select an appropriate setting of $k_{ngb}$ to achieve single-hop or multi-hop transmission and to minimize energy consumption during transmission. Effectively, the smart item is appropriately configured for the network conditions around the device and is able to reconfigure its communication topology if network conditions change.

Figure 5:
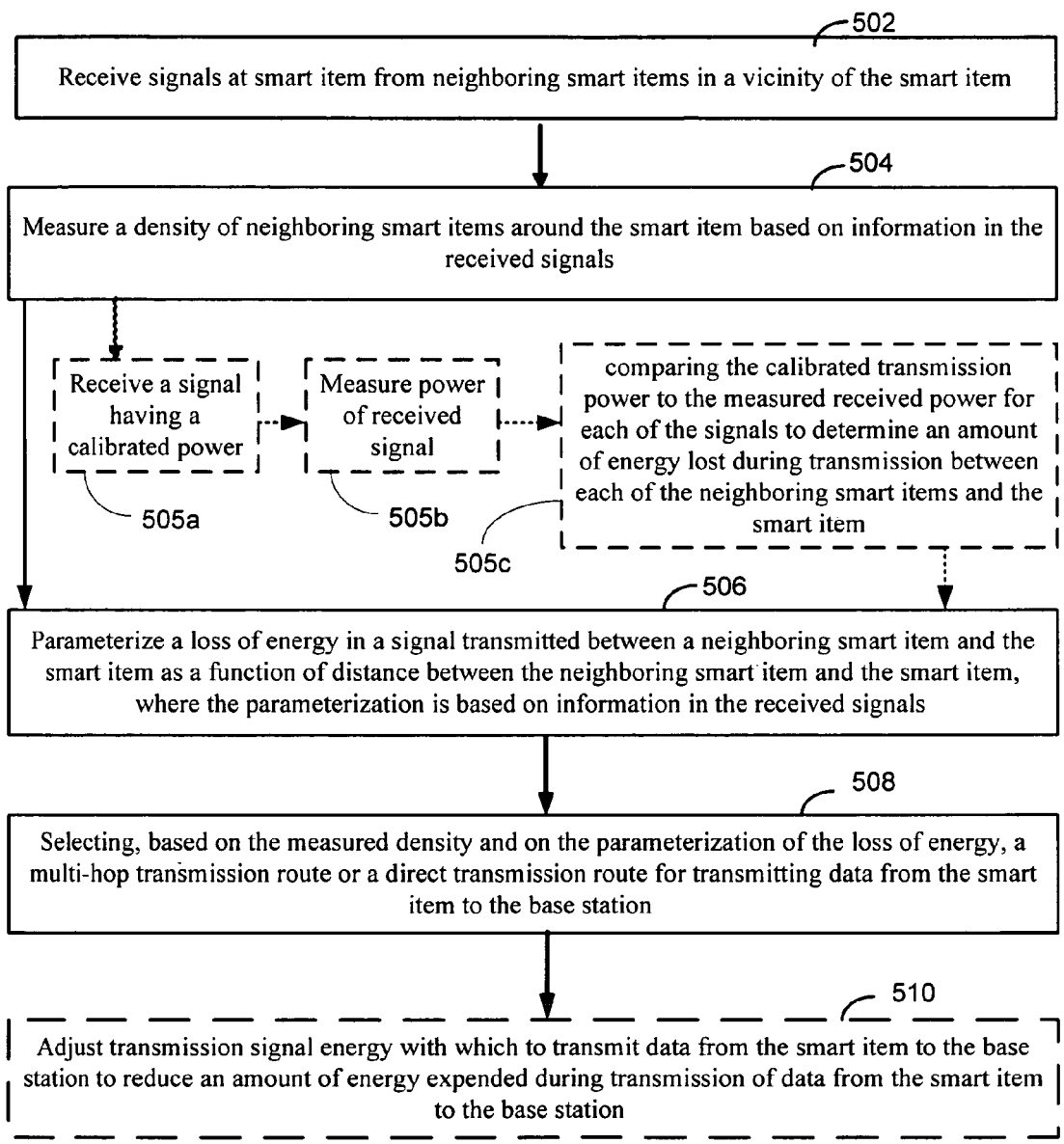
FIG. 5 is a flow chart of a process for selecting between a multi-hop and a single-hop transmission route for communication between a smart item and a base station.

FIG. 5 is a flow chart of a process 500 for selecting between a multi-hop and a single-hop transmission route for communication between a smart item and a base station. In the process 500, signals are received at the smart item from neighboring smart items in a vicinity of the smart item (step 502). Signals received at the smart item can include information about the locations of the neighboring smart items and/or a signal having a calibrated transmission power. In the process 500, a density of neighboring smart items is measured around the smart item based on information in the received signals (step 504). Measuring the density can include receiving, at the smart item, information about the locations of the neighboring smart items.

A signal having a calibrated transmission power can be received (step 505a), and the power of the received signal can be measured (step 505b). Then the calibrated transmission power can be compared with the measured received power to determine an amount of energy lost during transmission between each of the neighboring smart items and the smart item (step 505c).

In the process 500, a loss of energy in a signal transmitted between a neighboring smart item and the smart item as a function of distance between the neighboring smart item and the smart item, and the parameterization is based on information in the received signals (step 506). In the process 500, based on the measured density and on the parameterization of the loss of energy, a multi-hop transmission route or a single-hop transmission route is selected for transmitting data from the smart item to the base station (step 508). A transmission signal energy with which to transmit data from the smart item to the base station can be adjusted to reduce an amount of energy expended during transmission of data from the smart item to the base station (step 510). For example, the transmission power used to transmit data from a node could start with a low value and then increased until the desired value of $k_{ngb}$ is reached.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional information storage device and a printing device.

It is to be further understood that since some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

What is claimed is:

1. A method of selecting between a multi-hop transmission route and a single-hop transmission route for transmitting data from a smart item in a network of smart items to a base station, the method comprising:
   receiving signals at the smart item from neighboring smart items in a vicinity of the smart item;
   measuring a density of neighboring smart items around the smart item based on information in the received signals;
   parameterizing a loss of energy in a signal transmitted between a neighboring smart item and the smart item as a function of distance between the neighboring smart item and the smart item, wherein the parameterization is based on information in the received signals; and
   selecting, based on the measured density and on the parameterization of the loss of energy, a multi-hop transmission route or a single-hop transmission route for transmitting data from the smart item to the base station.

2. The method of claim 1, wherein measuring the density comprises receiving, at the smart item, information about the locations of the neighboring smart items.

3. The method of claim 1, wherein parameterizing the loss of energy comprises:
   receiving information at the smart item about the locations of the neighboring smart items;
   receiving, from each of the neighboring smart items at the smart item, a signal having a calibrated transmission power; and
   measuring a power of each of the received signals;
   comparing the calibrated transmission power to the measured received power for each of the signals to determine an amount of energy lost during transmission between each of the neighboring smart items and the smart item.

4. The method of claim 3, wherein parameterizing the loss of energy further comprises determining a parameter, $\alpha$, to relate a power of a signal received at the smart item, $P_{rec}$, to a power of the signal when transmitted from a neighboring smart item, $P_{trans}$, and a distance, r, between the smart item and the neighboring smart item through the relation, $P_{rec} \propto P_{trans}/r^{\alpha}$.

5. The method of claim 1, further comprising:
   storing pre-determined parameters characterizing an approximate equivalence between energy costs associated with single-hop transmission and multi-hop transmission for a model of the network of smart items; and
   selecting, based on the measured density, on the parameterization of the loss of energy, and on the pre-determined parameters, a multi-hop transmission route or a single-hop transmission route for transmitting data from the smart item to the base station.

6. The method of claim 1, further comprising:
   storing pre-determined parameters characterizing an approximate equivalence between energy costs associated with single-hop transmission and multi-hop transmission for a plurality of models of the network of smart items; and
   identifying pre-determined parameters characterizing an approximate equivalence between energy costs associated with single-hop transmission and multi-hop transmission for one of the plurality of models of the network of smart items; and
   selecting, based on the measured density, on the parameterization of the loss of energy, and on the identified pre-determined parameters, a multi-hop transmission route or a single-hop transmission route for transmitting data from the smart item to the base station.

7. The method of claim 1, further comprising adjusting a transmission signal energy with which to transmit data from the smart item to the base station, wherein the transmission signal energy is adjusted to reduce an amount of energy expended during transmission of data from the smart item to the base station.

8. The method of claim 1, further comprising:
   determining an amount of energy required to transmit a bit of data between the smart item and a neighboring smart item;
   determining an amount of energy required to receive a bit of data at the smart item from a neighboring smart item;

selecting, based on the measured density, based on the parameterization of the loss of energy, based on the amount of energy required to transmit a bit of data, and based on the amount of energy required to receive a bit of data, a multi-hop transmission route or a single-hop transmission route for transmitting data from the smart item to the base station.

9. The method of claim 1, further comprising adjusting transmission signal powers of the smart item and of the neighboring smart items to ensure that each smart item in the network of smart items is connected to the base station.

10. The method of claim 1, wherein the multi-hop path between the smart item and the base station along different smart items in the network is selected according to a shortest-path-finding algorithm.

11. A smart item within a network of smart items, wherein the network includes a base station, the smart item comprising:
an antenna for receiving signals from neighboring smart items of the network located in a vicinity of the smart item; and
a monitoring service adapted for:
measuring a density of neighboring smart items around the smart item based on information in the received signals;
parameterizing a loss of energy in a signal transmitted between a neighboring smart item and the smart item as a function of distance between the neighboring smart item and the smart item, wherein the parameterization is based on information in the received signals; and
selecting, based on the measured density and on the parameterization of the loss of energy, a multi-hop transmission route or a single-hop transmission route for transmitting data from the smart item to the base station.

12. The smart item of claim 11, wherein the received signals comprise information about the locations of the neighboring smart items, and wherein measuring the density of neighboring smart items around the smart item is based at least in part on the information about the locations of the neighboring smart items.

13. The smart item of claim 11, wherein the signals received from neighboring smart items comprise information about the locations of the neighboring smart items and signals having a calibrated transmission power, and the monitoring service is further adapted for:
measuring a power of a signal received from each of the neighboring smart items; and
comparing the calibrated transmission power to the measured received power to determine an amount of energy lost during transmission between each of the neighboring smart items and the smart item.

14. The smart item of claim 13, wherein parameterizing the loss of energy further comprises determining a parameter, $\alpha$, to relate a power of a signal received at the smart item, $P_{rec}$, to a power of the signal when transmitted from a neighboring smart item, $P_{trans}$, and a distance, r, between the smart item and the neighboring smart item through the relation, $P_{rec} \propto P_{trans}/r^{\alpha}$.

15. The smart item of claim 11, further comprising:
a memory adapted for storing pre-determined parameters characterizing an approximate equivalence between energy costs associated with single-hop transmission and multi-hop transmission for a model of the network of smart items; and
wherein the monitoring service is further adapted for:
selecting, based on the measured density, on the parameterization of the loss of energy, and on the pre-determined parameters, a multi-hop transmission route or a single-hop transmission route for transmitting data from the smart item to the base station.

16. The smart item of claim 11, further comprising:
a memory adapted for storing pre-determined parameters characterizing an approximate equivalence between energy costs associated with single-hop transmission and multi-hop transmission for a plurality of models of the network of smart items; and
wherein the monitoring service is further adapted for:
identifying pre-determined parameters characterizing an approximate equivalence between energy costs associated with single-hop transmission and multi-hop transmission for one of the plurality of models of the network of smart items; and
selecting, based on the measured density, on the parameterization of the loss of energy, and on the identified pre-determined parameters, a multi-hop transmission route or a single-hop transmission route for transmitting data from the smart item to the base station.

17. The smart item of claim 11, wherein the monitoring service is further adapted for adjusting a transmission signal energy with which to transmit data from the smart item to the base station via intermediate nodes, wherein the transmission signal energy is adjusted to reduce an amount of energy expended during transmission of data from the smart item to the base station.

18. The smart item of claim 11, wherein smart item is an RFID device.

19. The smart item of claim 11, wherein the monitoring service is further adapted for adjusting a transmission signal powers of the smart item to ensure that the smart item in the network is connected to the base station.

20. The smart item of claim 11, wherein the multi-hop path between the smart item and the base station along different smart items in the network is selected according to a shortest-path-finding algorithm.

* * * * *